June 21, 1938.  A. P. A. TEN BROEK  2,121,455
UNIVERSAL COUPLING
Filed April 16, 1936

INVENTOR
Alexander P. A. ten Broek
BY
ATTORNEYS

Patented June 21, 1938

2,121,455

UNITED STATES PATENT OFFICE 2,121,455

UNIVERSAL COUPLING

Alexander Petrus Antonius ten Broek, Kediri, Java, Dutch East Indies

Application April 16, 1936, Serial No. 74,727
In the Netherlands April 17, 1935

5 Claims. (Cl. 64—7)

This invention relates to universal couplings as particularly in use in motor-vehicles, for transmitting the power of the crank shaft to the rear axle, in order to permit relative movements of such rear axle with respect to the crank shaft.

The hitherto known universal or Cardan-couplings, which in principal consist of a ring or disc comprising four radial trunnions arranged pairwise at right angles to each other and journalled in bores in the shanks of two forks, are detrimental in that, when on account of wear of the pivots or the formation of lateral clearance, the point of intersection of the centre lines of the shafts to be coupled, are no longer in the centre of the disc or ring, the Cardan shaft performs an eccentric or wobbling movement, which not only increases the wear but also effects a disagreeable shaking movement of the vehicle accompanied by an annoying noise.

Now, universal couplings are known per se, comprising two ball surfaces connected to the elements to be coupled and arranged one within the other, the relative freedom of movement in the direction of rotation of one of the elements to be coupled, being suspended. In universal couplings of this type the above-mentioned detriments will not occur and the present invention has for its object to provide a universal coupling of this kind of such simple and appropriate construction that the same may be successfully employed in motor vehicles in lieu of the usual Cardan-couplings. The universal coupling according to the invention is of course also usable for other ends.

In connection therewith the invention consists in that the transmission of the power is effected by trunnions, arranged or formed on a block, movably fitting a diametrical slot in the inner ball surface, each of said trunnions resting in coinciding recesses of two flat rings surrounding such ball surfaces and non-rotatably arranged within corresponding recesses of a divided ball cup constituting the outer ball surface.

According to the invention the said flat ring may be provided with further sets of diametrically opposed recesses, so as to permit worn recesses to be immediately replaced by new recesses, without having to replace the rings as a whole.

In order to lock the rings in a simple and efficient manner against rotation, according to the invention pins are provided projecting into the rings and into one of the parts of the ball cup.

The invention is illustrated in the accompanying drawing.

Figure 1:
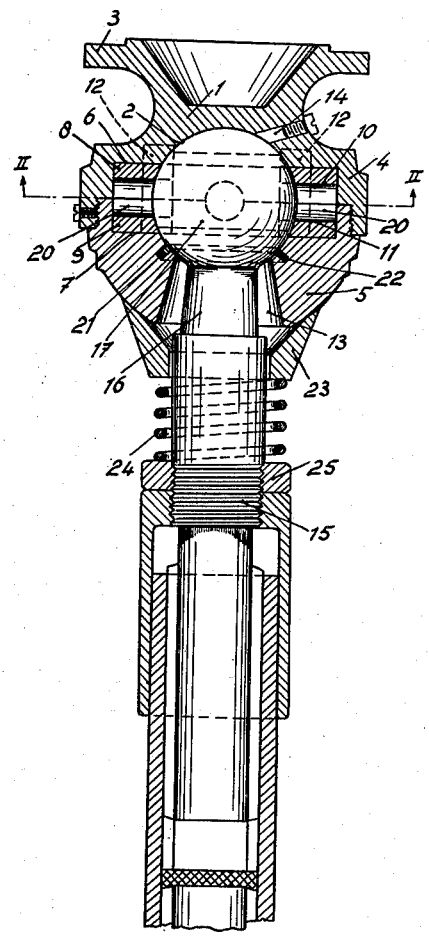
Fig. 1 shows a sectional elevational view of a universal coupling according to the invention.

The universal coupling shown in the drawing comprises a ball cup 1 having an internal ball surface 2 and being provided with a flange 3 for connecting said ball cup to one of the elements to be coupled, said ball cup being divided along the horizontal plane through the centre of the ball surface, the two parts 4, 5 being detachably connected with one another by screw-thread and locked against involuntary rotation.

In each of the parts 4, 5 is formed an annular recess 6 and 7 respectively, having a flat bottom surface, for accommodating a flat ring 8 and 9 respectively.

Figure 2:
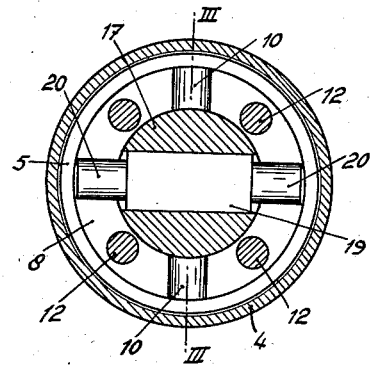
Fig. 2 is a cross-sectional view on the line II—II in Fig. 1 and viewed in the direction of the arrows.

These rings 8, 9 at their inner side are accurately machined in conformity with the ball surface, whilst, as particularly shown in Fig. 2, the surfaces of the rings facing each other, are provided with two pairs of diametrically opposed semicylindrical recesses 10, 11 in such a manner that at any time two recesses of one of said rings coincide with two recesses of the other ring, forming therewith a cylindrical bore. In these bores, if desired, in the case of rings of greater thickness, interchangeable wearing sleeves may be arranged. The rings 8, 9 are locked against rotation in the recesses of the ball cup by four pins 12 (Fig. 2), passing through both rings and projecting with one end into one of the parts 4, 5 of the ball cup, preferably into the part 4 as shown.

The lower portion 5 of the ball cup is provided with a conical radial passage 13, whilst in the upper portion 4, a closable bore 14 is formed for supplying a lubricant.

Figure 3:
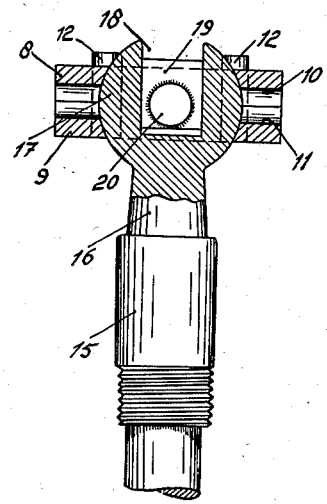
Fig. 3 is a cross-sectional view on the line III—III in Fig. 2, the ball cup being omitted.

The second element of the improved universal coupling consists of a shaft 15, on which on a neck 16, passing through the passage 13, is formed a ball head 17, of which the outer surface is accurately ground in conformity with the ball surface. The head 17 is provided with a diametrical rectangular slot 18 (Fig. 3), in which fits a block 19, lying free in said slot and being provided with two axial trunnions 20 journalled in the coinciding recesses 10, 11 of the rings 8, 9. The space of the slot 18 above and below the block constitutes a lubricant chamber, in which the lubricant passage 14 opens. Said chamber is closed at its lower end by a packing ring 21 arranged within an annular groove 22 of the portion 5 of the ball cup.

The passage 13 is closed dust-tight at its lower end by a cap 23 forced by a spring 24 with nut 25 against an exterior spherical surface of the lower portion 5 of the ball cup so that a permanent closure is assured. The lower end of the shaft 15 is provided with means for effecting an axially displaceable, but non-rotatable connection with the shaft to be coupled.

The universal coupling above-described is very robust and of simple construction and comprises a relatively small number of parts only, whilst the whole on account of the round shape is completely balanced. The conical passage 13 of the ball cup is so dimensioned, that a swinging movement of the shaft with the ball head to all sides and through an angle of 11° is possible, which for any motor vehicle is quite sufficient. Due to the block 19 lying free in the slot of the ball head and the trunnions, for transmitting the power, being journalled in the recesses of the stationary rings, said ball head is adapted to rotate about two axes at right angles to each other, so that the shaft with ball head, in view of the chosen width of the passage 13 may describe a conical surface having an apex angle of 22°. The apex of said cone lies in the centre of the ball head and as in view of the extended surface of the two contacting faces and the perfect lubrication, the wear is reduced to a minimum, the apex of said cone will always remain in the centre of the ball, so that the eccentrical swinging movement of the Cardan shaft will not occur.

With respect to the usual Cardan couplings, the coupling according to the invention has the further advantage, that the co-operating parts themselves constitute the lubricant chamber, so that a separate lubricant chamber as in the case of known couplings has to be provided about the forks, may be omitted.

What I claim is:—

1. In a universal coupling comprising two ball surfaces adapted to be connected with the elements to be coupled and arranged one within the other so that relative freedom of movement in the direction of rotation of one of said elements is prevented, a divided ball cup enclosing the inner ball surface and including means constituting part of the outer ball surface, a pair of flat rings surrounding said inner ball surface so as to constitute other parts of said outer ball surface and provided with registering grooves providing diametrically opposed bores extending radially of said inner ball surface, said cup having recesses receiving said rings, said inner ball surface having a diametrical slot therein and a torque transmitting element including a portion fitted movably within said diametrical slot and trunnions extending on opposite sides of said portion and resting in said bores formed by said rings.

2. A universal coupling as claimed in claim 1 in which the rings are provided with a plurality of sets of diametrically opposed bores whereby the trunnions may be shifted from a worn set to another.

3. A universal coupling as claimed in claim 1 including means projecting into said rings and into a part of said ball cup to lock the rings against rotation.

4. A universal coupling as claimed in claim 2 including a space for lubricant between the portion of said torque transmitting element fitted in said slot and an outer ball surface, and sealing means between said ball surfaces adjacent a point of connection of said inner ball surface to one of the elements to be coupled, to prevent leakage of lubricant from the coupling.

5. In a universal coupling comprising two ball surfaces adapted to be connected with the elements to be coupled and arranged one within the other such that relative freedom of movement in the direction of rotation of one of said elements is prevented, a divided ball cup enclosing the inner ball surface and including means constituting part of the outer ball surface, said cup having internal recesses therein which are open adjacent the inner ball surface and closed by exterior portions of the cup, mating removable members positioned within said recesses and constituting other parts of said outer ball surface and provided with registering grooves providing diametrically opposed bores extending radially of said inner ball surface, said inner ball surface having a diametrical slot therein, and a torque transmitting element including a portion fitted movably within said diametrical slot and trunnions extending on opposite sides of said portion and resting in said bores formed by said members.

ALEXANDER P. A. TEN BROEK.